United States Patent [19]

Ansel

[11] 4,093,258
[45] June 6, 1978

[54] MULTIPASSENGER PEDAL VEHICLE

[76] Inventor: Eldan L. Ansel, 202 E. Lotus, Ulysses, Kans. 67880

[21] Appl. No.: 758,844

[22] Filed: Jan. 13, 1977

[51] Int. Cl.² ............................................. B62K 13/04
[52] U.S. Cl. .................................. 280/231; 280/209; 280/273
[58] Field of Search ................ 280/209, 231, 222, 273

[56] References Cited

U.S. PATENT DOCUMENTS

| 264,855 | 9/1882 | Burley | 280/231 |
|---|---|---|---|
| 776,357 | 11/1904 | Shields | 280/231 |
| 3,175,843 | 3/1965 | Burke | 280/209 |
| 3,713,671 | 1/1973 | Boyer | 280/209 X |
| 3,938,827 | 2/1976 | Johnson | 280/209 |

FOREIGN PATENT DOCUMENTS

| 66,614 | 6/1945 | Denmark | 280/209 |
|---|---|---|---|
| 4,658 of | 1880 | United Kingdom | 280/231 |
| 11,109 of | 1888 | United Kingdom | 280/231 |

*Primary Examiner*—Joseph F. Peters, Jr.
*Assistant Examiner*—Terrance L. Siemens
*Attorney, Agent, or Firm*—Fishburn, Gold & Litman

[57] ABSTRACT

A multipassenger pedal vehicle comprising at least two rear drive assemblies, each having a conventional design and including a triangularly shaped frame, a rear wheel, a seat, and a pedal assembly. The rear drive assemblies are interconnected in a side-by-side, spaced apart, and aligned relationship by a plurality of laterally disposed connectors. A steering assembly, also having a conventional design and including a wheel mounted in a fork-shaped frame with handlebars, is positioned centrally and forwardly of the rear drive assemblies and is connected therewith for steering the vehicle. The handlebars extend outwardly and upwardly from the stationary sleeve member of the steering assembly, to a point respectively adjacent to and interior of each of the corresponding seats, whereby each of the users can, with one of his hands, grasp one of the upstanding handlebars, and singly, or in cooperation with the other user, pilot the vehicle. The vehicle is provided with a seat for each rider and handle members to be grasped for personal stability.

14 Claims, 14 Drawing Figures

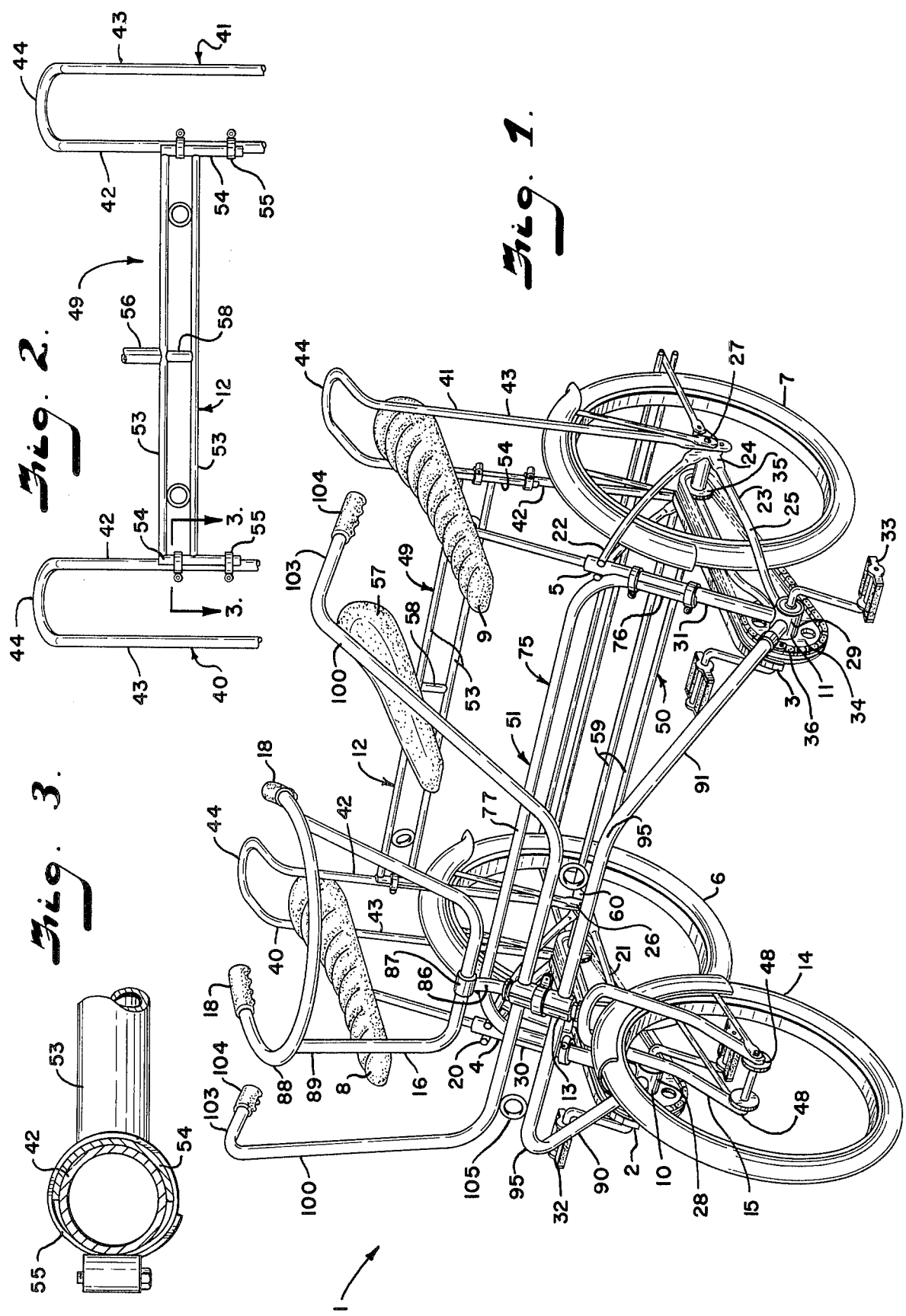

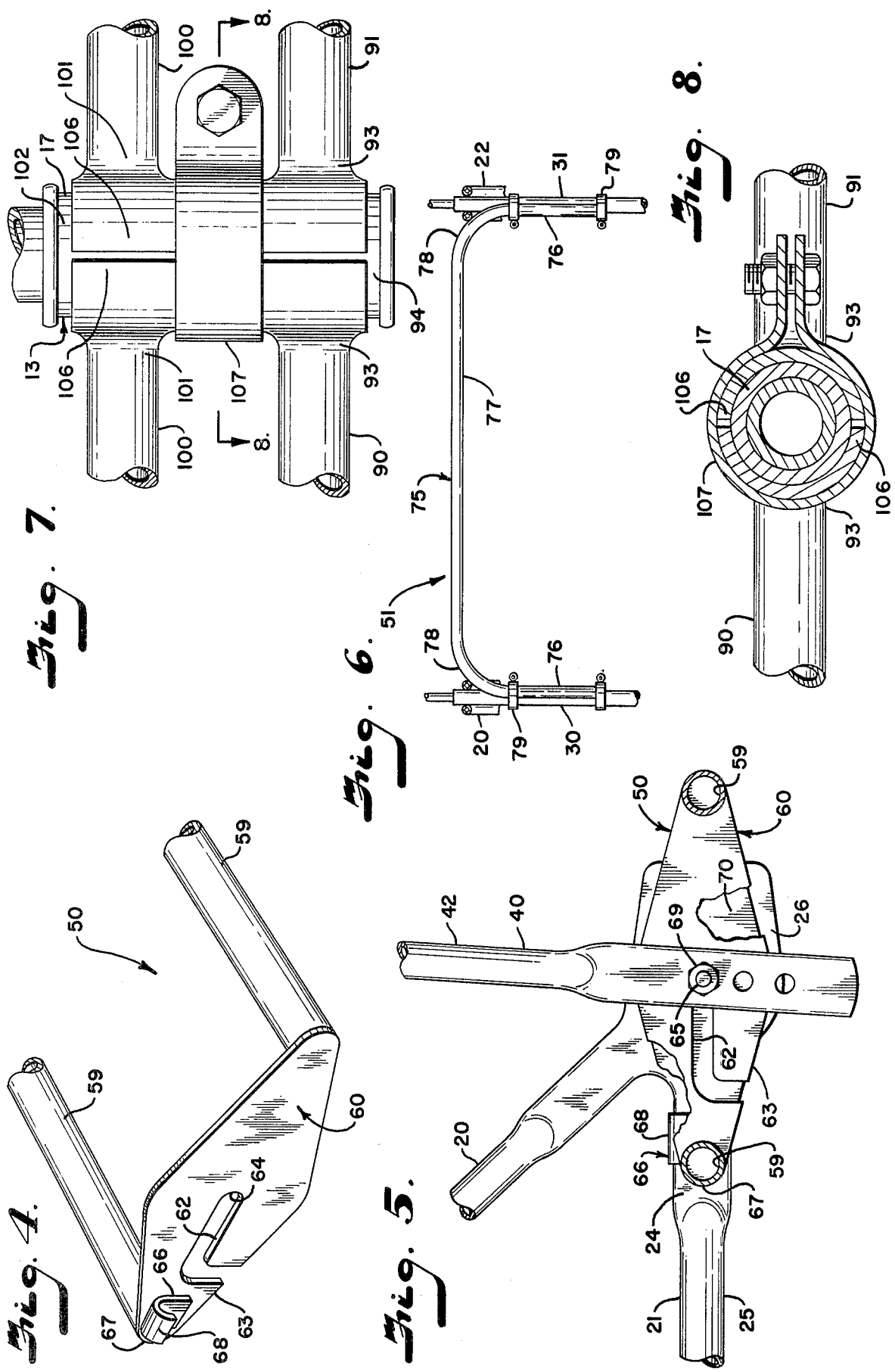

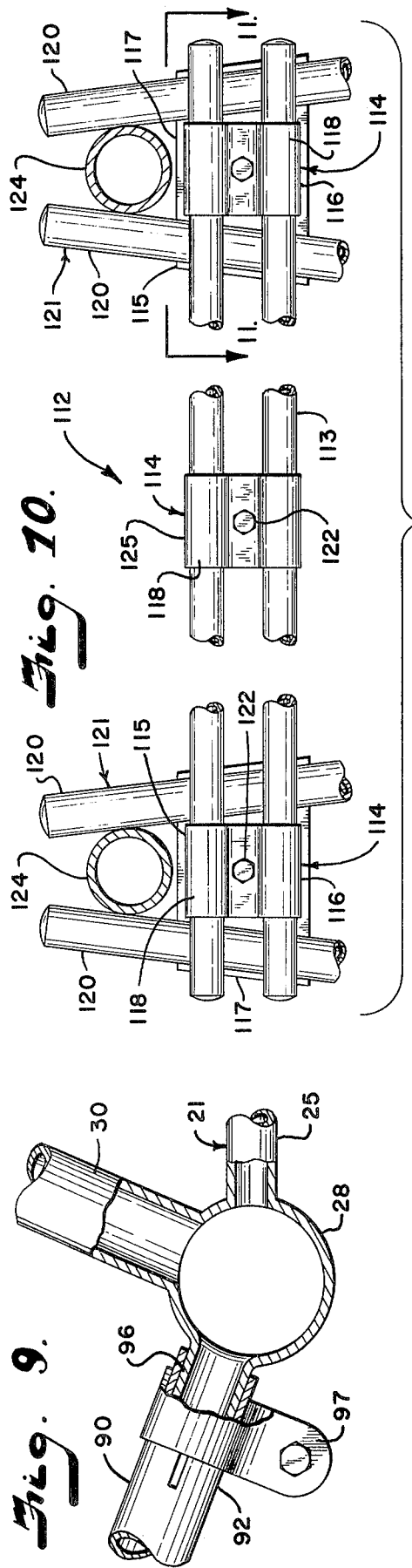
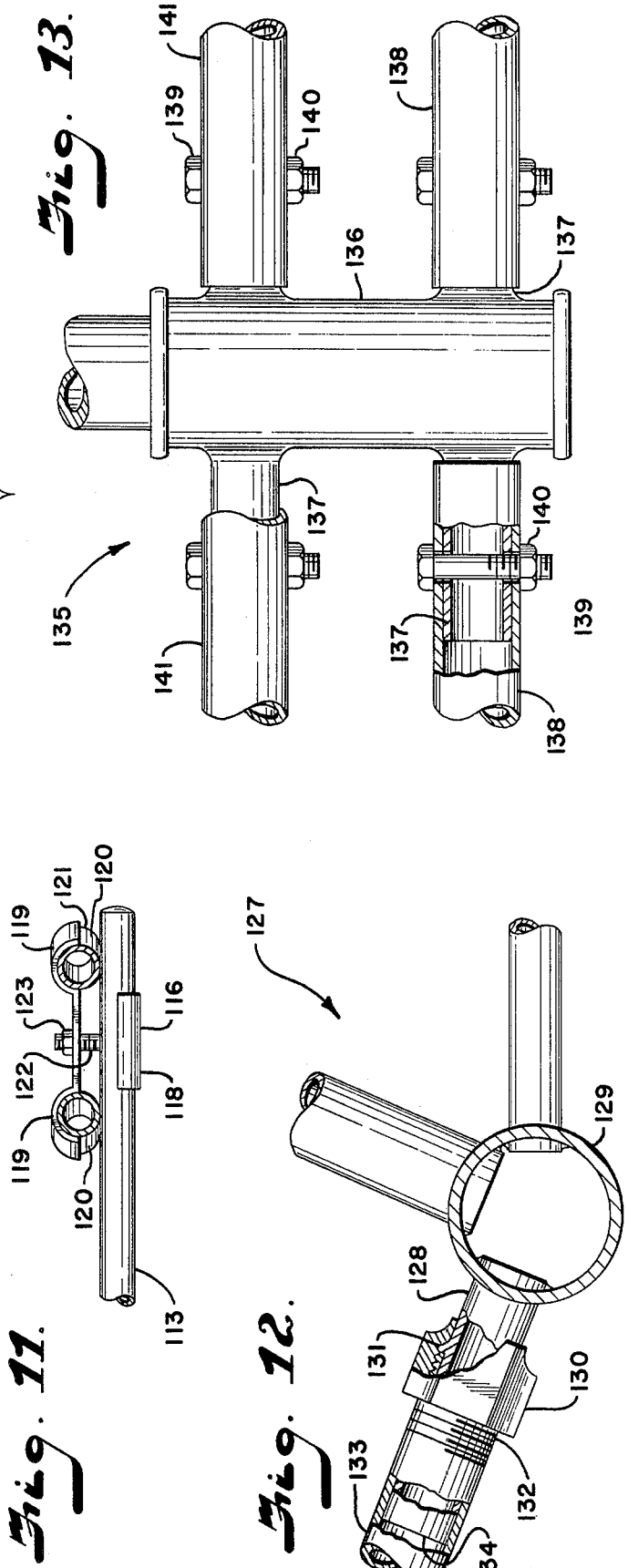

MULTIPASSENGER PEDAL VEHICLE

This invention relates to multipassenger pedal vehicles, and in particular to veloicpedes having side-by-side seats and a centrally disposed steering assembly for individual or cooperative steering.

The principal objects of the present invention are: to provide a multipassenger pedal vehicle having at least two side-by-side drive pedal assemblies and a single, centrally disposed steering assembly for individual and cooperative steering; to provide such a vehicle having a second set of handlebars which extend outwardly of, and are fixed relative to the steering handlebars, for stabilizing the rides during use; to provide such a vehicle wherein the rear drive assemblies are detachable from the steering assembly for compact storage, and ease of transportation; to provide such a vehicle wherein the various rear drive assemblies are detachably interconnected for complete disassembly and improved storage; to provide such a vehicle having an additional seat positioned intermediate of and supported by the rear drive assemblies for carrying non-pedaling passengers; to provide such a vehicle having first, second, and third rear drive assemblies in combination with a single steering assembly, to accommodate as many as three pedaling riders; and to provide such a vehicle which is economical to manufacture, efficient in use, capable of a long operating life and particularly well adapted for the proposed use.

Other objects and advantages of this invention will become apparent from the following description taken in conjunction with the accompanying drawings, wherein are set forth, by way of illustration and example, certain embodiments of this invention.

The drawings constitute a part of this application and include exemplary embodiments of the present invention and illustrate various objects and features thereof.

FIG. 1 is a perspective view of a multipassenger vehicle embodying the present invention, having tandem pedal assemblies, and being in the form of a tricycle.

FIG. 2 is a fragmentary rear elevational view of the vehicle, particularly showing a first detachable connector for interconnecting the pedal assemblies.

FIG. 3 is an enlarged horizontal cross-sectional view of the detachable connector taken along line 3—3, FIG. 2.

FIG. 4 is a fragmentary perspective view of a second detachable connector for interconnecting the pedal assemblies.

FIG. 5 is a vertical cross-sectional view of the second detachable connector as attached to one of the pedal assemblies.

FIG. 6 is a fragmentary front elevational view of the pedal assembly frame and a third detachable connector.

FIG. 7 is a fragmentary front elevational view of the steering assembly, particularly showing a device for detachably connecting the various rear pedal assemblies to the steering assembly.

FIG. 8 is a vertical cross-sectional view of the steering assembly taken along line 8—8, FIG. 7.

FIG. 9 is a fragmentary, vertical cross-sectional view of the pedal assembly housing, particularly showing detachable connection between the pedal and steering assemblies.

FIG. 10 is another embodiment of a transverse pedal assembly connector.

FIG. 11 is a fragmentary cross-sectional view of the connector taken along line 11—11, FIG. 10.

FIG. 12 is a fragmentary, vertical cross-sectional view of another embodiment of the pedal assembly housing, particularly showing a flanged sleeve and threaded joint construction.

FIG. 13 is a fragmentary front elevational view of another embodiment of the steering assembly.

Figure 14:
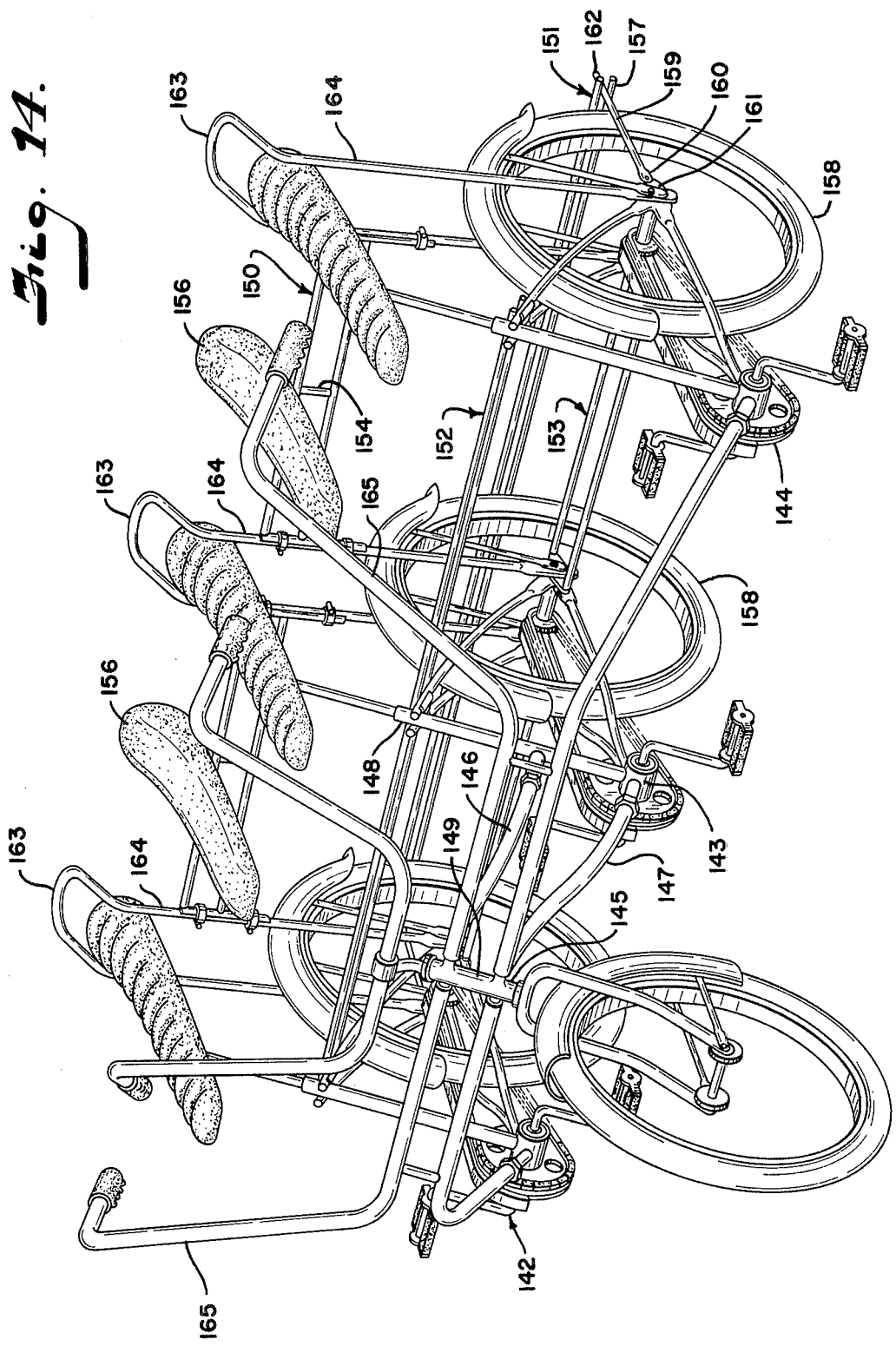
FIG. 14 is a perspective view of another embodiment of the multipassenger vehicle having three, interconnected, side-by-side pedal assemblies.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a multipassenger pedal vehicle in the form of a tricycle, embodying the present invention, and comprising first and second rear drive assemblies 2 and 3 respectively, each having a conventional or commercially standard design and including triangularly shaped frames 4 and 5, ground engaging wheels 6 and 7, seats 8 and 9, and pedal assemblies 10 and 11. The rear drive assemblies 2 and 3 are interconnected in a side-by-side, spaced apart and aligned relationship by a plurality of laterally extending connectors 12. A steering assembly 13, also has a conventional or commercially standard design, and includes a ground engaging wheel 14 mounted in a fork-shaped frame 15, with handlebars 16 connected therewith. The steering assembly 13 is positioned centrally and forwardly of the rear drive assemblies 2 and 3, and is connected therewith for steering the vehicle. The handlebars 16 extend from a member 17 of the steering assembly, and have hand grips 18 respectively adjacent to and interior of each of the corresponding seats 8 and 9, whereby the hand grips have less spacing than the seats and each of the users can with one of his hands, grasp one of the upstanding handlebars and individually, or in cooperation with the other user, pilot the vehicle 1.

Both of the rear drive assembly frames 4 and 5 have a conventional or commercially standard design, and include first and second fork members 20 and 21, and 22 and 23 respectively. The outwardly end 24 of each fork prong 25 is connected at first and second wheel support portions of the frame 26 and 27, wherein one of the rear wheels is rotatably mounted. The rear wheels 7 as well as the front wheel 14 have been illustrated with the spokes omitted to provide clear showing of the vehicle parts. The other end of each prong 25 of the second forks 21 and 23 is connected with a housing portion 28 and 29 of the pedal assemblies 10 and 11. Seat support members 30 and 31 have a tubular shape and have the lower end thereof connected with the housing portions 28 and 29 respectively, and extend therefrom upwardly to support the seats 8 and 9. The upper end of each prong of the first forks 20 and 22 is connected with the seat support members 30 and 31, in a spaced apart relation with the housing portions, thereby forming the triangularly shaped frames 4 and 5. Pedal cranks 32 and 33 are rotatably mounted within the housings 28 and 29 respectively, and include a mechanism thereon for transmitting rotational motion to the respective ground engaging rear wheel. In the illustrated structure, the power transmission device comprises a front sprocket 34 attached to the pedal crank 33, a rear sprocket 35 attached to the hub of rear wheel 7, and a roller chain 36 entrained thereover.

In the illustrated structure, the seats 8 and 9 are of an elongate construction, commercially termed banana seats, wherein a forward portion thereof has connection with the upstanding support members 30 and 31 respectively, and the rear portion thereof is supported by upstanding, U-shaped supports 40 and 41. Each of the supports 40 and 41 includes interior and exterior legs 42 and 43 which straddle the rear wheel, and have the ends thereof connected with the wheel support portions 26 and 27 respectively. The upper ends of each leg 42 and 43 extend beyond the seat and are integrally connected with a curved support portion 44, which is particularly adapted for grasping by one of the users.

The rear drive assembly frames 4 and 5 are interconnected by a plurality of transversely extending members 12 which hold the frames in a side-by-side, spaced apart and aligned relationship. The connecting members include first, second and third connectors 49, 50, and 51, which connect the U-shaped supports 40 and 41, the wheel support portions 26 and 27, and the seat support members 30 and 31 respectively. Although the connectors may have their respected ends rigidly and permanently affixed to their respective frame members by means such as welding, in the illustrated structure the connectors are detachably joined with the frames to facilitate vehicle disassembly for storage and transportation.

The first connector 49 comprises a rectangularly shaped support having a pair of parallel, and solid or tubular cylindrically shaped horizontal members 53, connected in a spaced apart relationship by a pair of vertical end members 54. The end members 54 are arcuately shaped and cooperatively and frictionally engage a portion of the cylindrical outer surface of each interior leg 42. In this example, the lower portion of each end 54 extends below the lowermost horizontal member 53 for improved rigidity. A plurality of adjustable clamps such as hose clamps 55 detachably connect the support 59 with each of the U-shaped supports 40 and 41, thereby tying those members together. In the illustrated structure, a third seat support 56 is connected with and upstanding from the upper horizontal member 53, and includes a seat 57 attached thereto to support a non-pedaling vehicle passenger. The seat 57 is positioned laterally, centrally of the seats 8 and 9, and the non-pedaling passenger grasps the curved portion 44 of each adjacent seat support 40 and 41 to balance himself thereon. An intermediate brace 58 is connected between the two horizontal members 53, in substantial alignment with the third seat support 56, and provides additional structural strength.

The second connector 50 comprises two elongate support members 59 which are retained in a parallel and spaced apart relationship by a pair of end plates 60, and form a rectangularly shaped frame. Each of the plates 60 has an L-shaped slot 62 therethrough which extends from the lower forward edge 63 of the plate, to a central portion 64 of the same. The slot 62 is adapted to slide over the axially extending wheel bolt 65 of the rear drive assembly 3 and is elongated to facilitate transverse adjustment of the connector. A clip member 66 is connected with the forward end 67 of the plate on the exterior surface thereof and includes an arcuate portion 68 which abuttingly engages the cylindrically shaped interior prong 25 of each of the second forks 21 and 23 respectively. In this example, the elongate support members 59 have a cylindrical shape, and the end plates 60 are in the shape of a diamond with rounded corners. A nut 69 threadingly engages the wheel bolt 65 and draws the plate 60 securely against a spacer 70 abutting the wheel support portion 26, thereby detachably connecting those portions of the frame.

The third connector 51 comprises a C-shaped support 75 having a pair of vertically disposed legs 76 interconnected by a cylindrically shaped, and horizontally disposed crossmember 77 with rounded corners 78. Each leg 76 has a convex-concave cross-sectional shape, the concave surface of which cooperatively engages the outer surface of a different one of the cylindrically shaped seat support members 30 and 31. A plurality of clamps 79 detachably connect the support 75 with each of the seat support members 30 and 31. Preferably, the crossmember 77 is positioned slightly above the ends of the first forks 20 and 22.

The fork-shaped frame 15 of the steering assembly 13 includes a pair of free ends 48 wherein the front wheel 14 is rotatably mounted. The fork 15 includes an integral journal portion which is pivotally mounted within the stationary sleeve member 17 for relative rotation between the sleeve and the wheel 14. A neck portion 86 has connection with the end of the journal, extends upwardly therefrom, and includes a clamp 87 at the uppermost end thereof wherein the handlebars 16 are retained. The handlebars 16 are curvilinear in shape and extend upwardly, outwardly and rearwardly from the neck 86 to a point respectively adjacent to and interior of each of the corresponding seats 8 and 9. The free end of each of the bars is shaped for grasping, and in this example, includes a grip 18 connected therewith. The grip is positioned next to its associated seat whereby each of the users can, with one of his hands, grasp his handlebar grip, and individually, or in cooperation with the other user, steer the vehicle. In the illustrated structure, the handlebars include an arcuately shaped member 88 which is connected with the upstanding handlebar portions 89, and positioned in a substantially horizontal relationship thereto. The arcuate member is tubular, and extends both rearwardly and forwardly of the point of connection with the upstanding handlebar portions, to facilitate one-handed steering. The entire steering assembly 13 is positioned centrally between and forwardly of the rear drive assemblies 2 and 3, and is securely connected therewith.

The rear drive assemblies 2 and 3 are attached to the steering assembly 13 by a pair of elongate bars 90 and 91, each having one end 92 thereof connected with the housing portions 28 and 29 respectively of the frames. The bars 90 and 91 extend in a curvilinear fashion from the housing portions, and have their upper ends 93 connected with opposing sides of the lower portion 94 of the sleeve member 17. The shape of each elongate bar is curved to avoid interfering with the user's legs while pedaling, and in the illustrated structure, has an L-shape with a rounded medial portion 95. Preferably, the bars 90 and 91 are of a tubular construction with a circular cross-sectional shape. To facilitate vehicle disassembly, the lower end 92 of each elongate bar 90 and 91 has a longitudinally split terminal portion which cooperatively slides over and abuts a protruding sleeve portion 96 of the pedal assembly housing 29. A clamp 97 is positioned about the split terminal portion 92, and constrictively draws the segments thereof into frictional connection with the sleeve 96. The clamp 97 is radially expandable to facilitate complete vehicle disassembly.

The vehicle structure 1 includes a second pair of handlebars 100 having one set of ends 101 thereof connected with an upper portion 102 of the sleeve member 17 on opposing sides thereof. The second handlebars 100 are stationary relative to the steering handlebars 16, and extend outwardly, upwardly and rearwardly from the sleeve 17 to a point respectively adjacent to and exterior of the corresponding seat. Each of the handlebar members has a free end 103 thereof which is adapted for grasping by one hand of one of the users, and in this example includes a grip 104. A pair of structural supports 105 connect the members of the second handlebars 100 with tubular bars 90 and 91 respectively, at a point spaced apart from the sleeve 17, and provide structural strength to the second handlebars 100. The illustrated supports 105 of FIG. 1 are in the shape of a circular ring, and may assume a linear configuration as shown in FIG. 14. In the illustrated structure, the sleeve member 17 includes an outer split member 106 and clamp 107 for detachably connecting the second handlebars 100 and tubular connecting bars 90 and 91 to the steering assembly 13. Each of the split member's halves have a concave cylindrical surface which cooperatively mates with the outer surface of the sleeve 17 and frictionally engages the same for quick and complete vehicle disassembly.

Another embodiment of the multipassenger pedal vehicle is generally designated by the reference numeral 112, and includes a pair of rods 113, held in a parallel relationship by a plurality of clamps 114 spaced longitudinally and regularly along the rods. The clamps 115 at the extreme ends of the rods each have first and second cooperating portions 116 and 117 respectively. The first clamp portion 116 has a pair of parallel channels 118 therein which mate with and engage the two rods 113. The second clamp portion 117 also includes a pair of channels 119 therein which cooperate with and engage the struts or prongs 120 of the first rear fork 121. At least one adjustable fastening device such as bolt 122 and nut 123 is positioned through a centrally disposed aperture in each of the clamping portions 116 and 117, and removably attaches the rods 113 to each of the rear drive assembly frames, thereby tying the same in a side-by-side manner. In the illustrated structure, the end clamps 115 are positioned adjacent to the seat support members 124. At least one intermediate clamp 125 having a construction similar to the end clamps 115, is provided to keep the rods 113 in a parallel relationship, and to increase connector rigidity.

The reference numeral 127 generally designates another embodiment of the pedal vehicle having a sleeve 128 projecting from the pedal assembly housing 129. An internally threaded cap 130 is rotatably mounted on the sleeve 128 by a peripheral rim member 131, and engages the threaded end 132 of the tubular connecting bar 133. The outer end 134 of the sleeve 128 extends slidingly within the bar 133 and abuts the cylindrically shaped inner surface thereof for increased connection strength.

Another embodiment of the multipassenger vehicle is designated by the reference number 135, and includes a steering assembly having a sleeve member 136 with truncated upper and lower tubular members 137 attached to and projecting from opposing sides thereof. The tubular bars 138 which connect the steering assembly with the pedal assemblies (not shown) are positioned slidingly over the lower members 137 and are retained thereon by suitable fastening means such as bolt 139 and nut 140. In a similar manner, the second handlebars 141 are attached to the upper members 137 of the sleeve.

Another embodiment of the multipassenger pedal vehicle is illustrated in FIG. 14, and includes first, second and third drive assemblies 142, 143 and 144 respectively, in combination with a single steering assembly 145. The rear drive assemblies 142, 143 and 144, are interconnected in a side-by-side, spaced apart and aligned relationship much similar to that of the previously described vehicle. The second drive assembly 143 includes an additional pair of tubular connecting bars 146 and 147 which connect the second drive assembly frame 148 with the sleeve member 149. The mechanisms connecting the first and third drive assemblies 142 and 144 with the second drive assembly 143, are similar to those previously discussed, and in this example include a pair each of first, second, third and fourth connectors 150, 151, 152 and 153 respectively, each of which detachably interconnects the drive assembly frames. In this example, the first connector 150 includes a center support bar 154 and an upstanding seat support on which a seat 156 is mounted for use by a non-pedalling passenter. The second connector 151 comprises a pair of parallel rods 157 positioned slightly rearwardly of the vehicle rear wheels 158 and extends laterally across the vehicle from the first to the third drive assemblies. A plurality of legs 159 have an apertured end 160 thereof removably connected with the wheel hub plate 161 and the other end 162 is connected with and positioned between the rods. In use, the non-pedalling passengers maintain their balance by grasping the curved portions 163 of those upstanding rear seat suppports 164 disposed adjacent to the seat which he occupies. The user of the second drive assembly fully controls the vehicle's steering, and the users situated on the first and third drive assemblies are balanced by grasping with one hand of the second handlebars 165.

It is to be understood that while I have illustrated and described certain forms of my invention, it is not to be limited to the specific forms or arrangement of parts herein described and shown.

What I claim and desire to secure by Letters Patent is:
1. A multipassenger pedal vehicle comprising:
(a) a plurality of drive assemblies each having a frame with a pedal assembly, ground engaging wheel and seat mounted thereon, the seat being above said wheel and the pedal assembly being operatively connected to said wheel for rotating same;
(b) a steering assembly having a fork with a ground engaging wheel rotatably mounted therein and a stationary sleeve rotatably mounting said fork and handlebars connected to said fork for turning the same in said sleeve;
(c) rigid connecting means extending from the drive assembly frames to said sleeve and having means separably connecting said sleeve to each of said drive assemblies;
(d) vertically spaced first and second rigid transverse connecting means extending between the drive assembly frames and having means separably connecting the same to each of said drive assembly frames;

(e) stationary handlebars separably connected to said sleeve and extending laterally outwardly and rearwardly therefrom; and (f) means separably connecting said stationary handlebars to the respective adjacent rigid connecting means that extends from a drive assembly frame to said sleeve.

2. A multipassenger pedal vehicle comprising:

(a) first and second drive assemblies each having a conventional design and including a triangularly shaped frame having a ground engaging wheel and a pedal assembly rotatably mounted therein in spaced apart relation, and a seat attached thereto and positioned above said wheel; means operably connecting each of said pedal assemblies with the respective ground engaging wheel for transmitting rotational motion thereto;

(b) first transverse rigid means interconnecting said drive assemblies in a side-by-side, spaced apart and aligned relationship;

(c) a steering assembly having a conventional design and including a fork with a ground engaging wheel rotatably mounted therein, and a sleeve wherein said fork is pivotally mounted; said sleeve and said steering assembly wheel being positioned centrally between and forwardly of said drive assemblies;

(d) second rigid means connecting each of said drive assembly frames with said sleeve; and (e) a first pair of handlebars positioned centrally of said drive assembly frames, being connected with said steering fork for rotating same relative to said sleeve; said first handlebars comprising a base connected with said steering fork and first and second bars extending opposingly outwardly and rearwardly therefrom to a point respectively adjacent to and interior of the corresponding seat; each of said bars having a free end thereof adapted for grasping by one hand of one user.

3. A multipassenger pedal vehicle as set forth in claim 2 including:

(a) a second pair of handlebars comprising first and second bars; each of said bars of said second pair or handlebars having a first end thereof connected with opposing sides of said sleeve, and a second end thereof extending outwardly, upwardly and rearwardly therefrom to a point respectively adjacent to and exterior of the corresponding seat with each terminating in a free end adapted for grasping by the other hand of one user.

4. A multipassenger pedal vehicle as set forth in claim 3 wherein:

(a) said bars of the first and second pairs of handlebars are tubular and each of said tubular bars of said second pair of handlebars has connection with said second rigid connecting means at a point spaced apart from said sleeve.

5. A multipassenger pedal vehicle as set forth in claim 4 wherein:

(a) said first pair of handlebars includes an arcuately shaped tubular member connected with said first and second tubular bars thereof respectively at points thereon adjacent to the free end thereof; said arcuately shaped tubular member extending forwardly of said first and second tubular bars of said first pair of handlebars and along a substantially horizontal plane to facilitate one-handed steering.

6. A multipassenger pedal vehicle as set forth in claim 2 wherein:

(a) each of said seats includes a U-shaped support attached to and depending from a rear portion of said seat; said U-shaped support having interior and exterior legs connected with said frame;

(b) said first connecting means includes first, second and third elongate braces each being positioned between and laterally of said frames; said first brace having connection with the interior legs of said U-shaped support; said second brace having connection with said frames at a point adjacent to said wheels; said third brace having connection with said frames at a point adjacent to said seats.

7. A multipassenger pedal vehicle as set forth in claim 2 wherein:

(a) said first and second frames include a first and second housing respectively wherein said pedal assemblies are mounted; and (b) said second connecting means includes first and second L-shaped tubular members each having a first end thereof connected with said first and second housings respectively, and a second end thereof connected with opposing sides of said sleeve; each of said L-shaped tubular members having an arcuately shaped medial portion.

8. A multipassenger pedal vehicle as set forth in claim 7 wherein the connections between the first and second housings and the L-shaped tubular members each include:

(a) a first elongate terminal member extending from one of said respective housings and said L-shaped tubular member;

(b) a second elongate terminal member extending from the other of the housings and L-shaped tubular member and having a hollow longitudinally split end portion for slidably receiving said first elongate terminal member therein;

(c) an adjustable clamp means positioned about and constrictingly engaging said split portion of said second terminal member to separably secure the first and second terminal members together.

9. A multipassenger pedal vehicle as set forth in claim 7 wherein:

(a) said first and second housings each have a sleeve attached thereto and protruding therefrom;

(b) said first end of each of said L-shaped tubular members includes a longitudinally split terminal portion positioned about the corresponding sleeve; and (c) an adjustable clamp positioned about and constrictingly engaging each of said split terminal portions thereby detachably connecting said drive assemblies with said steering assemblies.

10. A multipassenger pedal vehicle as set forth in claim 9 including:

(a) means detachably connecting said second and third braces with said frames, and said first brace with said U-shaped support; and (b) means detachably connecting the second end of each of said L-shaped tubular members with said sleeve.

11. A multipassenger pedal vehicle as set forth in claim 10 wherein:

(a) said second brace comprises a pair of elongate support members each having ends; a pair of plates connected with one end of each support member and retaining said support members in a parallel and spaced apart relationship;

(b) each of said plates has an arcuately shaped slot therethrough; said slot extending from a lower forward edge of said plate to a central portion thereof, and being shaped to slide over an axially extending wheel bolt for attaching said plate to said frame;

(c) each of said frames includes first and second fork members; said fork member having an interior and an exterior prong; and (d) each of said plates has a clip member connected with a forward end of said plate, and includes an arcuate portion abuttingly engaging the interior prong of said second fork member.

12. A multipassenger vehicle as set forth in claim 2 including:

(a) a third drive assembly having a commercially standard design and including a third triangularly shaped frame with a third wheel and a third pedal assembly rotatably mounted therein, and a third seat attached thereto; means operably connecting said third pedal assembly with said third wheel and transmitting motion thereto; and (b) third means connecting said third drive assembly with said first and second drive assemblies in a side-by-side, spaced apart, and aligned relationship.

13. A multipassenger pedal vehicle as set forth in claim 12 including:

(a) a second pair of handlebars comprising first and second tubular bars; each of said tubular bars having a first end thereof connected with opposing sides of said sleeve, and a second end thereof extending outwardly, upwardly and rearwardly therefrom to a point respectively adjacent to and exterior of the corresponding seat, each of said tubular bars having a free end thereof adapted for grasping by the other hand of each of said users.

14. A multipassenger pedal vehicle as set forth in claim 13 wherein:

(a) each of said tubular bars has connection with said second connecting means at a point spaced apart from said sleeve.

* * * * *